(12) United States Patent
Inoue et al.

(10) Patent No.: US 9,959,975 B2
(45) Date of Patent: May 1, 2018

(54) CERAMIC ELECTRONIC COMPONENT

(71) Applicant: Murata Manufacturing Co., Ltd., Nagaokakyo-shi, Kyoto-fu (JP)

(72) Inventors: Mitsunori Inoue, Nagaokakyo (JP); Yoshihito Okutomi, Nagaokakyo (JP); Tomohiko Mori, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days. days.

(21) Appl. No.: 14/805,546

(22) Filed: Jul. 22, 2015

(65) Prior Publication Data
US 2016/0027561 A1 Jan. 28, 2016

(30) Foreign Application Priority Data
Jul. 28, 2014 (JP) .................. 2014-153086

(51) Int. Cl.
| | | |
|---|---|---|
| *H01C 7/10* | (2006.01) | |
| *H01G 4/30* | (2006.01) | |
| *H01C 7/02* | (2006.01) | |
| *H01C 7/04* | (2006.01) | |
| *H01C 7/18* | (2006.01) | |
| *H01G 4/12* | (2006.01) | |
| *H01G 4/224* | (2006.01) | |

(52) U.S. Cl.
CPC .............. *H01G 4/30* (2013.01); *H01C 7/021* (2013.01); *H01C 7/041* (2013.01); *H01C 7/1006* (2013.01); *H01C 7/18* (2013.01); *H01G 4/1209* (2013.01); *H01G 4/224* (2013.01)

(58) Field of Classification Search
CPC ... H01C 7/10; H01C 1/14; H01C 1/01; H01C 7/021; H01C 7/041; H01C 7/1006
USPC .................. 338/20, 309, 313, 327, 330, 332
See application file for complete search history.

(56) References Cited

U.S. PATENT DOCUMENTS

| | | | | |
|---|---|---|---|---|
| 5,275,707 A * | 1/1994 | Yamada | ................ | H01C 7/105 204/484 |
| 5,614,074 A * | 3/1997 | Ravindranathan | ..... | H01C 1/034 205/123 |
| 6,214,685 B1 * | 4/2001 | Clinton | .................. | H01C 1/034 438/382 |
| 6,232,867 B1 * | 5/2001 | Yoshida | ................. | H01C 7/102 29/610.1 |
| 6,535,105 B2 * | 3/2003 | Heistand, II | ........... | H01C 1/028 29/610.1 |
| 6,841,191 B2 * | 1/2005 | Wu | ........................ | C25D 5/022 205/122 |

(Continued)

FOREIGN PATENT DOCUMENTS

| | | |
|---|---|---|
| JP | H0917607 A | 1/1997 |
| JP | 2000-30911 A | 1/2000 |

(Continued)

*Primary Examiner* — Kyung Lee
(74) *Attorney, Agent, or Firm* — Arent Fox LLP

(57) ABSTRACT

A ceramic electronic component that includes a ceramic element, and a coating film and external electrodes on a surface of the ceramic element. The coating film includes cationic elements from a constituent element of the ceramic element, which are ionized and deposited from the ceramic element, and a resin. The surface of the coating film is recessed relative to a surface of wrapping parts of the external electrodes on the surface of the ceramic element.

14 Claims, 3 Drawing Sheets

(56) References Cited

U.S. PATENT DOCUMENTS

| | | | |
|---|---|---|---|
| 7,659,806 B2 * | 2/2010 | Tamaki | H01C 1/14 338/307 |
| 8,009,012 B2 * | 8/2011 | Kajino | H01C 1/14 29/610.1 |
| 2001/0035810 A1 | 11/2001 | Heistand, II et al. | |
| 2002/0050909 A1 | 5/2002 | Jinno et al. | |
| 2004/0169267 A1 * | 9/2004 | Matsuoka | H01C 1/146 257/684 |
| 2012/0223798 A1 | 9/2012 | Wei | |

FOREIGN PATENT DOCUMENTS

| | | |
|---|---|---|
| JP | 2001093770 A | 4/2001 |
| JP | 2004-500719 A | 1/2004 |
| JP | 2010123865 A | 6/2010 |
| JP | 2011204778 A | 10/2011 |
| KR | 1019980703131 A | 10/1998 |

\* cited by examiner

CERAMIC ELECTRONIC COMPONENT

BACKGROUND OF THE INVENTION

1. Field of the Invention

The present invention relates to a ceramic electronic component.

2. Description of the Related Art

The ceramics used in electronic components are likely to be chemically eroded by acids or alkalis dues to changes in the ceramic material required by the sophisticated functions of the electronic components.

Therefore, as measures against this situation, techniques have been proposed for coating ceramic element surfaces of the electronic components with resin, as described in Japanese Unexamined Patent Application Publication No. 2004-500719 and U.S. Patent Publication No. 2012/0223798.

Coating the ceramic element surfaces of the electronic components can reduce the influence of chemical erosion on the ceramic elements, such as that caused by a plating solution during plating or a used in mounting. Further, coating the ceramic element surfaces can, in the case of plating, suppress the growth by plating onto the ceramic element surfaces, and thereby reduce defective conductivity of the electronic component.

Furthermore, coating the ceramic element surfaces can prevent ingress of moisture, plating solutions, flux, etc. into the electronic components, and prevent reliability degradation, or electrical property degradation due to deposition by plating onto internal electrodes.

SUMMARY OF THE INVENTION

However, in the case of coating a ceramic element surface of an electronic component with resin as described in Japanese Unexamined Patent Application Publication No. 2004-500719, film formation is not able to be selectively achieved only on the ceramic element surface, because the resin coating is provided (applied) over the entire surface of the electronic component. Therefore, there is a need for a step of forming a resin coating film over the entire surface of the electronic component before the formation of external electrodes, and removing the resin coating film on end surfaces of the electronic component on which external electrodes are to be formed, and the manufacturing cost is thus increased.

In addition, in the case of resin coating carried out after the formation of external electrodes as described in U.S. Patent Publication No. 2012/0223798, a resin coating film is formed only on the ceramic element surface after masking the external electrodes, while the troublesome operation results in high manufacturing cost.

Moreover, coating the ceramic element surface of the electronic component with resin increases the size of the electronic component. In particular, in order to completely prevent ingress of plating solutions, etc., the resin coating film needs to have a certain level of thickness, and the surface of the resin coating film may project from the surfaces of wrapping parts of the external electrodes, which are formed on side surfaces of the electronic component.

In this case, when the electronic component is mounted on a circuit substrate or the like, there is concern that the occurrence of a tombstone phenomenon will lead to defective mounting.

Therefore, an object of the present invention is to provide a ceramic electronic component where a coating film that has favorable chemical erosion resistance can be inexpensively formed, and defective mounting such as a tombstone phenomenon is unlikely to be caused.

The present invention provides a ceramic electronic component including a ceramic element, a coating film provided on a surface of the ceramic element, and an external electrode provided on an end of the ceramic element.

The coating film includes a resin, and a cationic element among the constituent elements of the ceramic element.

The surface of the coating film is recessed from the surface of a wrapping part of the external electrode, which is formed on a side surface of the ceramic element.

Among the constituent elements of the ceramic element, the cationic element eluted from the ceramic element is deposited and contained in the coating film. Furthermore, the constituent elements of the ceramic element include at least one of Ba, Ti, Ca, Zr, Fe, Ni, Cu, Zn, Mn, Co, Al, and Si. In addition, a plated film may be provided on the external electrode.

In an aspect of the present invention, the coating film includes a resin and at least one kind of cationic elements among the constituent elements of the ceramic element, and the coating film can be selectively formed only on the surface of the ceramic element of the electronic component.

In addition, in another aspect of the present invention, the coating film is recessed from the wrapping parts of the external electrodes, and defective mounting such as a tombstone phenomenon is thus unlikely to be caused.

In addition, in the ceramic electronic component according another aspect of to the present invention, the wrapping part of the external electrode formed on the side surface of the ceramic element is preferably brought into contact with the surface of the ceramic element. Then, the wrapping parts of the external electrodes are firmly jointed to the surface of the ceramic element.

Furthermore, the ceramic electronic component according to a further aspect of the present invention preferably has a coating film provided in recesses formed at the surface of the ceramic element. Then, the thickness of the coating film on the surface of the ceramic element is reduced in appearance just by the depth dimensions of the recesses, and thus, even when the thickness of the coating film is increased in order to enhance the chemical erosion resistance, the surface of the coating film is recessed from the wrapping parts of the external electrodes, and defective mounting such as a tombstone phenomenon is thus unlikely to be caused.

In addition, in the ceramic electronic component according to a further aspect of the present invention, the resin preferably has a thermal decomposition temperature of 240° C. or higher. Furthermore, the resin preferably includes at least one of an epoxy resin, a polyimide resin, a silicone resin, a polyamideimide resin, a polyetheretherketone resin, and a fluorine-containing resin. Thus, the ceramic electronic component has high heat resistance.

In addition, in the ceramic electronic component according to another aspect of the present invention, the coating film is preferably cross-linked by heating. Thus, the coating film can be formed in a short period of time.

According to the various aspects of the present invention, the coating film can be selectively formed only on the surface of the ceramic element, and the ceramic electronic component can be obtained whose manufacturing cost is inexpensive. In addition, the coating film is recessed from the wrapping parts of the external electrodes, and the ceramic electronic component can be thus obtained which is unlikely to cause defective mounting such as a tombstone phenomenon.

The foregoing object, and other objects, features, and advantages of the invention will become evident from the following description of embodiments, which will be provided with reference to the drawings.

DETAILED DESCRIPTION OF THE INVENTION

An embodiment of a ceramic electronic component according to the present invention will be described.

1. Ceramic Electronic Component

A ceramic electronic component according to the present invention will be described with reference to a varistor as an example.

Figure 1:
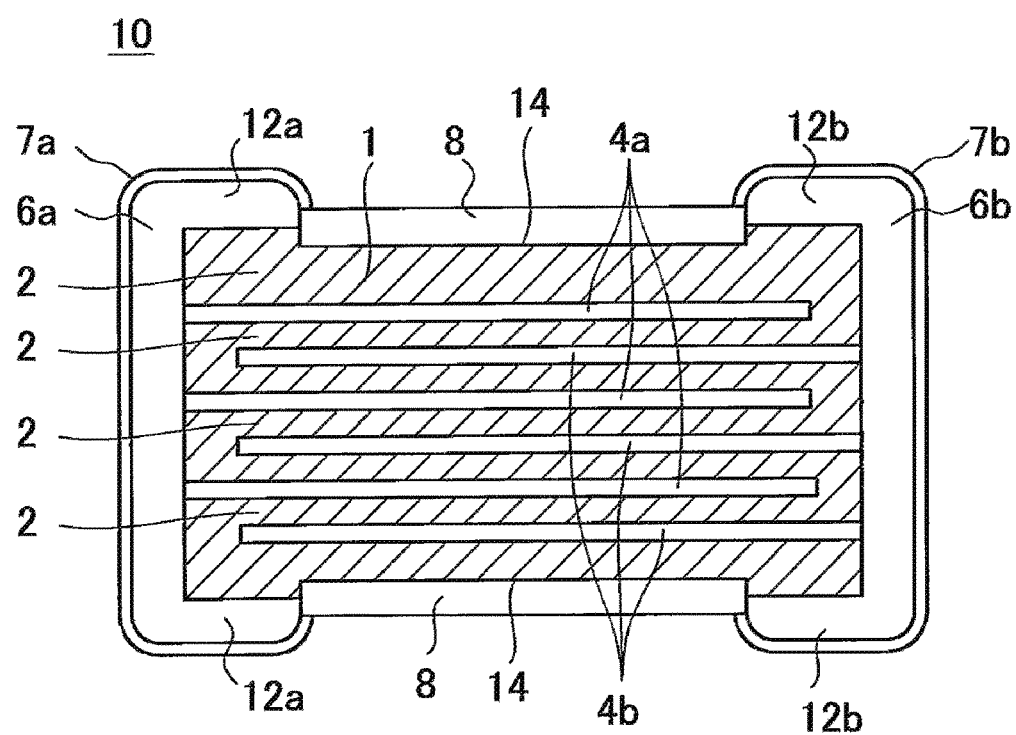
FIG. 1 is a cross-sectional view illustrating an embodiment of a ceramic electronic component according to the present invention.

FIG. 1 is a cross-sectional view illustrating a varistor 10 that is a ceramic electronic component according to an aspect of the present invention. The varistor 10 includes a substantially cuboidal ceramic element 1, external electrodes 6a and 6b formed on right and left ends of the ceramic element 1, and a coating film 8 formed so as to cover four side surfaces of the ceramic element 1.

The ceramic element 1 is a laminated body obtained by stacking a plurality of ceramic layers 2 and multiple pairs of internal electrodes 4a and 4b opposed to each other with the ceramic layers 2 interposed therebetween.

The ceramic layers 2 are composed of a ceramic material in which $Bi_2O_3$ is present as a second phase at grain boundaries of a sintered body of ZnO crystal grains with Mn, Co, Sn, or Cr therein as a solid solution.

The internal electrodes 4a have ends extended to the left end surface of the ceramic body 1, and electrically connected to the external electrode 6a. The internal electrodes 4b have ends extended to the right end surface of the ceramic body 1, and electrically connected to the external electrode 6b. Thus, a varistor function is achieved at sites with the internal electrodes 4a and 4b opposed. The internal electrodes 4a and 4b are composed of Ag, Cu, Ni, Pd, or an alloy of these metals.

The external electrodes 6a and 6b respectively have wrapping parts 12a and 12b formed to extend on the four side surfaces of the ceramic element 1. The wrapping parts 12a and 12b are formed directly on the surface of the ceramic element 1. Thus, the wrapping parts 12a and 12b are firmly joined to the surface of the ceramic element 1.

Plated films 7a and 7b are formed on the surfaces of the external electrodes 6a and 6b. The plated films 7a and 7b protect the external electrodes 6a and 6b, and make solderability of the external electrodes 6a and 6b favorable.

On parts of the surface of the ceramic element 1 other than regions on which the external electrodes 6a and 6b are formed, a coating film 8 is formed. The coating film 8 is provided in recesses 14 formed by etching the surface of the ceramic element 1 excluding the regions for the external electrodes 6a and 6b. Thus, the coating film 8 provided in contact with the surfaces of the recesses 14 roughened by etching is firmly joined to the surfaces of the recesses 14 due to the anchor effect.

The coating film 8 includes a resin, and cationic elements among the constituent elements of the ceramic element 1. The cationic elements among the constituent elements of the ceramic element 1, which are contained in the coating film 8, are deposited by partial elution from the ceramic layers 2 of the ceramic element 1. More specifically, the cationic elements among the constituent elements of the ceramic element 1 include Zn, Bi, Mn, Co, Sn, Cr, etc. deposited respectively by elution from ZnO, $Bi_2O_3$, MnO, $Co_2O_2$, $SnO_2$, $Cr_2O_3$, etc. in the ceramic layers 2.

The resin included in the coating film 8 is a polyvinylidene chloride resin, an acrylic resin, an epoxy resin, a polyimide resin, a silicone resin, a polyamideimide resin, a polyetheretherketone resin, a fluorine-containing resin, or the like. The varistor 10 typically undergoes a mounting step with soldering, and the coating film 8 preferably has high heat resistance (240° C. or higher). Accordingly, a resin is preferred which has a thermal decomposition temperature of 240° C. or higher. In this regard, there is a relationship of: (polyvinylidene chloride resin, acrylic resin)<epoxy resin< (polyimide resin, polyamideimide resin, polyetheretherketone resin, silicone resin, fluorine-containing resin) in terms of heat resistance.

In the case of the thus configured varistor 10, the coating film 8 includes a resin and cationic elements among the constituent elements of the ceramic element 1, and the coating film 8 can be selectively formed only on the surface of the ceramic element of the varistor 10. Accordingly, the varistor 10 can be obtained whose manufacturing cost is inexpensive.

Furthermore, the thickness of the coating film 8 on the surface of the ceramic element 1 is reduced in appearance just by the depth dimensions of the recesses 14, and thus, even when the thickness of the coating film 8 is increased in order to enhance the chemical erosion resistance, the surface of the coating film 8 can be recessed from the surfaces of the wrapping parts 12a and 12b of the external electrodes 6a and 6b, and defective mounting such as a tombstone phenomenon is thus unlikely to be caused.

2. Method for Manufacturing Ceramic Electronic Component

Figure 2:
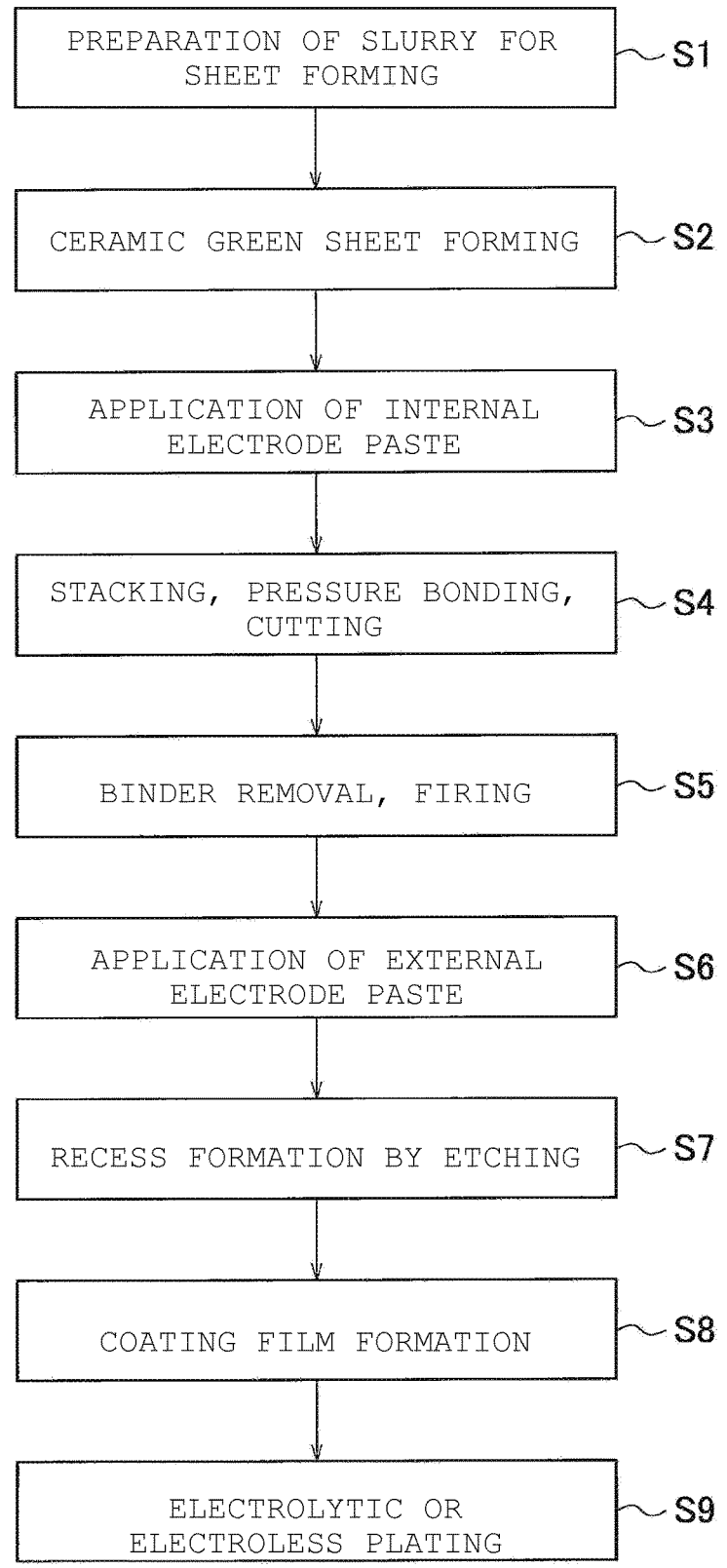
FIG. 2 is a flowchart showing an example of a method for manufacturing the ceramic electronic component shown in FIG. 1.

Next, an example of a method for manufacturing the varistor 10 will be described with reference to FIG. 2. FIG. 2 is a flowchart showing an example of a method for manufacturing the varistor 10.

In a step S1, an organic binder, a dispersant, a plasticizer, etc. are added to a ceramic material in which $Bi_2O_3$ is present as a second phase at grain boundaries of a sintered body of ZnO crystal grains with Mn, Co, Sn, or Cr therein as a solid solution, thereby preparing slurry for sheet forming.

Next, in a step S2, the slurry for sheet forming is formed into sheets by a doctor blade method to provide rectangular ceramic green sheets.

Next, in a step S3, an internal electrode paste containing Ag is applied onto the ceramic green sheets by a screen printing method to form electrode paste films which are to be the internal electrodes 4a and 4b.

Next, in a step S4, the multiple ceramic green sheets with the electrode paste films formed are stacked so as to alternate directions in which ends of the electrode paste films are extended, and subjected to pressure bonding. This laminated ceramic green sheet is cut into a size for individual ceramic elements 1 to provide a plurality of unfired ceramic elements 1.

Next, in a step S5, the unfired ceramic elements 1 are subjected to binder removal treatment at a temperature of 400° C. to 500° C. Thereafter, the unfired ceramic elements 1 are subjected to firing for 2 hours at a temperature of 900° C. to 1000° C. to provide sintered ceramic elements 1. The ceramic green sheets and the electrode paste films are subjected to co-firing, and the ceramic green sheets serve as the ceramic layers 2, whereas the electrode paste films serve as the internal electrodes 4a and 4b.

Next, in a step S6, an external electrode paste (AgPd alloy paste) is applied to both ends of the sintered ceramic elements 1. Thereafter, on the sintered ceramic elements 1, the external electrode paste is heated at a temperature of 900° C. to form the external electrodes 6a and 6b electrically connected respectively to the internal electrodes 4a and 4b.

Next, in a step S7, the ceramic elements 1 are immersed in an etching solution to etch the surfaces of the ceramic elements 1 excluding the regions for the external electrodes 6a and 6b, thereby forming the recesses 14. Used for the etching solution is a solution that dissolves the ceramic elements 1, but does not dissolve the external electrodes 6a and 6b. Specifically, a solution is used which contains an inorganic acid such as a sulfuric acid, a hydrochloric acid, a hydrofluoric acid, and a phosphoric acid.

Next, in a step S8, to the ceramic elements 1, a resin-containing solution is provided by an immersion method, or applied by spin coating. The resin-containing solution has the function of finely etching the surfaces of the ceramic elements 1 to ionize the constituent elements of the ceramic elements 1, and includes a resin component dissolved or dispersed in an aqueous solvent. Furthermore, the resin-containing solution includes a neutralizer for dissolution or dispersion of the resin component, and if necessary, a surfactant for reaction with cationic elements among the dissolved constituent elements of the ceramic elements. It is to be noted that after providing the resin-containing solution, the ceramic elements 1 are washed with a polar solvent such as pure water, if necessary.

Therefore, the resin-containing solution finely etches (dissolves) the surfaces of the ceramic elements 1 to ionize the constituent elements of the ceramic elements 1. In regard to the etching (dissolving) function of the resin-containing solution, the etching (dissolving) reaction can be developed just with the constituents of the resin-containing solution without adding any etching promoting constituent such as halogen, because the main constituent is ZnO in the case of the varistor 10. More specifically, the etching (dissolving) reaction proceeds when the pH of the resin-containing solution is set in a pH range (pH<5, pH>11) in which Zn is present stably as ions.

Then, the resin component dissolved (dispersed) in the resin-containing solution reacts with cationic elements among the ionized constituent elements of the ceramic elements 1 to neutralize the charge of the resin component. As a result, the resin component settles out along with cationic elements among the constituent elements of the ceramic elements 1, and selectively deposits only on the surface of the ceramic element. Accordingly, in the deposited resin component, at least one kind of cationic elements, which are defined as ionized constituent elements of the ceramic elements, are incorporated.

On the other hand, the resin component is not deposited on the external electrodes 6a and 6b. However, at the interfaces between the ceramic elements 1 and the external electrodes 6a and 6b, the resin component may slightly extend on the surfaces of the external electrodes 6a and 6b. This is believed to be the resin component deposited on the surface of the ceramic element, which slightly extends to the external electrodes 6a and 6b, rather than the deposition reaction proceeding at the surfaces of the external electrodes 6a and 6b.

The resin included in the resin-containing solution is a polyvinylidene chloride resin, an acrylic resin, an epoxy resin, a polyimide resin, a silicone resin, a polyamideimide resin, a polyetheretherketone resin, a fluorine-containing resin, or the like, but basically, it does not matter what kind as long as the resin is deposited by the present treatment.

In this way, the coating film 8 including the cationic elements among the constituent elements of the ceramic elements 1, which are ionized and deposited from the ceramic elements 1, and the resin is formed on the surface of the ceramic element. Thereafter, the coating film 8 is subjected to heating treatment. The heating treatment is intended to accelerate a cross-linking reaction between the resin components in the resin-containing solution deposited, and the heating condition varies depending on the type of the resin component. In general, the cross-linking reaction is likely to proceed under high temperature. However, the excessively increased temperature increases the decomposition reaction of the resin component. Accordingly, it is preferable to set optimum temperature and time in accordance with the resin component.

Next, in a step S9, the plated films 7a and 7b are formed on the external electrodes 6a and 6b by an electrolytic or electroless plating method. The plated films 7a and 7b adopt, for example, a double structure composed of a Ni plated film as a lower layer and an Sn plated film as an upper layer.

In this way, the coating film 8 can be selectively formed only on the surface of the ceramic element. Accordingly, the varistor 10 whose manufacturing cost is inexpensive can be manufactured with favorable mass productivity. In addition, the method can be also adapted to the varistor 10 including the external electrodes 6a and 6b which have a complex shape or microstructure, because the coating film 8 is formed by chemical action.

3. Modification Example of Ceramic Electronic Component

Figure 3:
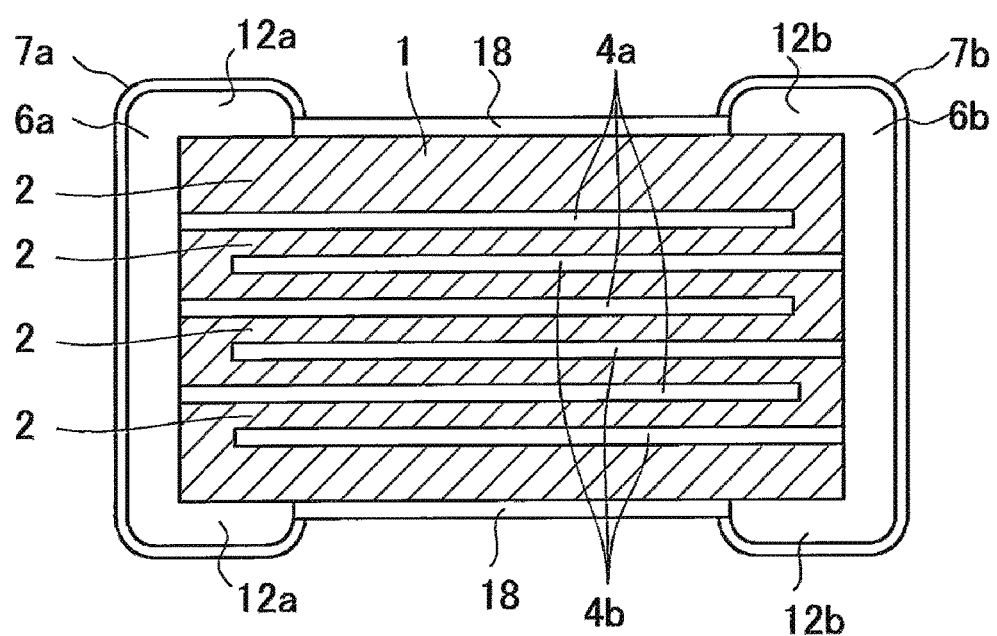
FIG. 3 is a cross-sectional view illustrating a modification example of a ceramic electronic component according to the present invention.

FIG. 3 is a cross-sectional view illustrating a modification example of the varistor 10.

Except that the surface of a ceramic element 1 has no recess 14 formed, a varistor 10A has the same structure as the varistor 10 shown in FIG. 1, and detailed description thereof will be thus omitted.

In the case of the varistor 10A, on the surface of the ceramic element 1 excluding the regions for external electrodes 6a and 6b, a coating film 18 is formed. The coating film 18 including a resin, and cationic elements among the constituent elements of the ceramic element 1 is selectively formed only on the surface of the ceramic element 1 of the varistor 10A.

The coating film 18 includes a resin, and cationic elements among the constituent elements of the ceramic element 1. The cationic elements among the constituent elements of the ceramic element 1, which are contained in the coating film 18, are deposited by partial elution from the ceramic layers 2 of the ceramic element 1. More specifically, the cationic elements among the constituent elements of the ceramic element 1 include Zn, Bi, Mn, Co, Sn, Cr, etc. deposited respectively by elution from ZnO, $Bi_2O_3$, MnO, $Co_2O_2$, $SnO_2$, $Cr_2O_3$, etc. in the ceramic layers 2.

Furthermore, the surface of the coating film 18 is recessed from the surfaces of wrapping parts 12a and 12b of the external electrodes 6a, 6b, and the height dimensions of the wrapping parts 12a, 12b are larger than the thickness dimension of the coating film 18. Thus, defective mounting such as a tombstone phenomenon is unlikely to be caused.

It is to be noted that the thickness of the coating film 18 of the varistor 10A is set to be smaller than the thickness of the coating film 8 of the varistor 10. This is intended to ensure that the coating film 8 is easily recessed from the wrapping parts 12a and 12b of the external electrodes 6a and 6b, because the surface of the ceramic element 1 is not provided with any recess 14 in the case of the varistor 10A.

EXAMPLE

1. Preparation of Example and Comparative Example

The varistor 10 (with the recesses 14) according to an example and a varistor (without any recesses) according to a comparative example were each prepared by the manufacturing method according to the embodiment described previously. However, the immersion of the ceramic element in the etching solution in the step S7 was skipped in the case of the varistor according to the comparative example.

As the resin-containing solution, a commercially available latex of a resin component dispersed in an aqueous solvent was used with an etching promoting constituent and a surfactant added thereto, if necessary.

As the resin-containing solution, an acrylic resin (Trade Name: Nipol LX814A (from Zeon Corporation)) as the resin component was used through the adjustment of the pH to 4.0 with the addition of a sulfuric acid as the etching promoting constituent to the resin. To this resin, 1 vol % of NEWREX (registered trademark, from NOF Corporation) was added as a surfactant. The resin-containing solution was adjusted so as to have a solid content concentration of 10 wt %.

The recesses 14 of the varistor 10 according to the example were formed in such a way that the ceramic element 1 was etched by immersion in a 5% sulfuric acid for 1 minute at room temperature, then washed with pure water, and dried. The recesses 14 are approximately 5 μm in etching depth.

The coating film 8 of the varistor 10 according to the example and the coating film of the varistor according to the comparative example were each formed on the surface of the ceramic element 1, in such a way that the ceramic element 1 was immersed in the resin-containing solution at room temperature for 10 minutes, washed with pure water, and dried at 150° C. for 30 minutes. The coating films are both approximately 12 μm in thickness.

The wrapping parts 12a and 12b of the external electrodes 6a and 6b are approximately 10 μm in height (thickness) dimension. Accordingly, in the case of the varistor 10 (with the recesses 14) according to the example, the wrapping parts 12a and 12b of the external electrodes 6a and 6b are greater in height than the coating film 8, and the coating film 18 is recessed from the wrapping parts 12a and 12b of the external electrodes 6a and 6b. On the other hand, in the case of the varistor (without any recesses) according to the comparative example, the wrapping parts of the external electrodes are approximately 2 μm lower in height than the coating film, and the coating film projects from the wrapping parts of the external electrodes.

2. Characterization Methods and Evaluation Results in Example and Comparative Example The prepared varistors according to the example and the comparative example were subjected to the following characterization.

(a) Solubility in Acid

With the use of ICP-AES, the acid resistance was evaluated from the amount of dissolution of the Zn constituent in the case of immersing the varistor in 5 ml of a 0.3% nitric acid solution for 3 minutes at room temperature. The number of samples evaluated is 10.

As a result, the amount of Zn dissolution was 0.026 mg and smaller in the case of the varistor 10 (with the recesses 14) according to the example. On the other hand, the amount of Zn dissolution was 0.525 mg and larger in the case of the varistor (without any recesses) according to the comparative example.

(b) Mountability

The varistor was mounted on a circuit substrate with a solder paste applied thereto to evaluate the tombstone incidence. The number of samples evaluated is 10000. As a result, the tombstone incidence was 0% and favorable in the case of the varistor 10 (with the recesses 14) according to the example. On the other hand, the tombstone incidence was 0.2% and disadvantageous in the case of the varistor (without any recesses) according to the comparative example.

It is to be noted that the invention is not to be considered limited to the previously described embodiment, but can be modified variously within the scope of the invention. Examples of the ceramic electronic component include, besides varistors, multilayer ceramic capacitors, laminated coils, PTC thermistors, and NTC thermistors.

In the case of multilayer ceramic capacitors, ceramic layers constituting ceramic elements are composed of a ceramic material of $Pb(Mg, Nb)O_3$—$PbTiO_3$—$Pb(Cu, W)$—$ZnO$—$MnO_2$ as a main constituent mixed with $Li_2O$—$BaO$—$B_2O_3$—$SiO_2$ as an anti-reducing agent, or a ceramic material containing $CaZrO_3$—$CaTiO_3$ as its main constituent. Therefore, among the constituent elements of the ceramic elements, which are contained in the coating films, the cationic elements include Pb, Mg, Nb, Ti, Ba, Li, Zn, Mn, Si, Ca, and Zr each eluted and deposited from $Pb(Mg, Nb)O_3$—$PbTiO_3$—$Pb(Cu, W)$—$ZnO$—$MnO_2$, $Li_2O$—$BaO$—$B_2O_3$—$SiO_2$, $CaZrO_3$—$CaTiO_3$, or the like of the ceramic layers.

In the case of laminated coils, ceramic layers constituting ceramic elements are composed of a magnetic ceramic material such as a Cu—Zn ferrite and a Ni—Zn ferrite. Therefore, among the constituent elements of the ceramic elements, which are contained in the coating films, the cationic elements include Sr, Sn, Fe, Ni, Cu, Zn, Mn, and Co each eluted and deposited from the Cu—Zn ferrite, Ni—Zn ferrite, or the like of the ceramic layers.

In the case of PTC thermistors, ceramic layers constituting ceramic elements are composed of, for example, a ceramic material of $BaTiO_3$ as a main constituent with $Y_2O_2$ as a semiconducting agent, $SiO_2$ and $Al_2O_2$ as a curing agent, and $MnO_2$ as a property improving agent each added thereto and mixed therein. Therefore, among the constituent elements of the ceramic elements, which are contained in the coating films of the PTC thermistors, the cationic elements include Ba, Ti, Y, Si, and Mn each eluted and deposited from $BaTiO_3$, $Y_2O_3$, $SiO_2$, $Al_2O_2$, or $MnO_2$ of the ceramic layers.

In the case of NTC thermistors, ceramic layers constituting ceramic elements are composed of, for example, a ceramic material of $Mn_3O_4$, NiO, $Co_2O_3$, etc. mixed. Therefore, among the constituent elements of the ceramic elements, which are contained in the coating films of the NTC thermistors, the cationic elements include Mn, Ni, and Co each eluted and deposited from $Mn_3O_4$, NiO, $Co_2O_3$, or the like of the ceramic layers.

What is claimed is:

1. A ceramic electronic component comprising:
a ceramic element;
a coating film on a surface of the ceramic element; and
an external electrode on an end of the ceramic element,
wherein the coating film includes a resin, and a cationic element that is a constituent element of the ceramic element, and the cationic element is an element that was eluted from the ceramic element, and
a surface of the coating film is recessed relative to a surface of a wrapping part of the external electrode, the wrapping part being located on the surface of the ceramic element.

2. The ceramic electronic component according to claim 1, wherein the wrapping part of the external electrode is in direct contact with the surface of the ceramic element.

3. The ceramic electronic component according to claim 1, wherein the surface of the ceramic element includes a recess and the coating film is provided in the recess.

4. The ceramic electronic component according to claim 3, wherein the wrapping part of the external electrode is not in the recess.

5. The ceramic electronic component according to claim 3, wherein the recess is on a side surface of the ceramic element.

6. The ceramic electronic component according to claim 3, wherein the recess is on four side surfaces of the ceramic element, the surface being one of the four side surfaces.

7. The ceramic electronic component according to claim 1, wherein the surface is a side surface of the ceramic element.

8. The ceramic electronic component according to claim 1, wherein the coating film is on four side surfaces of the ceramic element, the surface being one of the four side surfaces.

9. The ceramic electronic component according to claim 1, wherein the constituent element of the ceramic element includes at least one of Ba, Ti, Ca, Zr, Fe, Ni, Cu, Zn, Mn, Co, Al, and Si.

10. The ceramic electronic component according to claim 1, wherein the resin has a thermal decomposition temperature of 240° C. or higher.

11. The ceramic electronic component according to claim 1, wherein the resin comprises at least one of an epoxy resin, a polyimide resin, a silicone resin, a polyamideimide resin, a polyetheretherketone resin, and a fluorine-containing resin.

12. The ceramic electronic component according to claim 1, wherein the coating film contains cross-linked resin components.

13. The ceramic electronic component according to claim 1, further comprising a plated film on the external electrode.

14. The ceramic electronic component according to claim 1, wherein a thickness of the coating film is smaller than a thickness of the wrapping part of the external electrode.

* * * * *